Patented Dec. 24, 1940

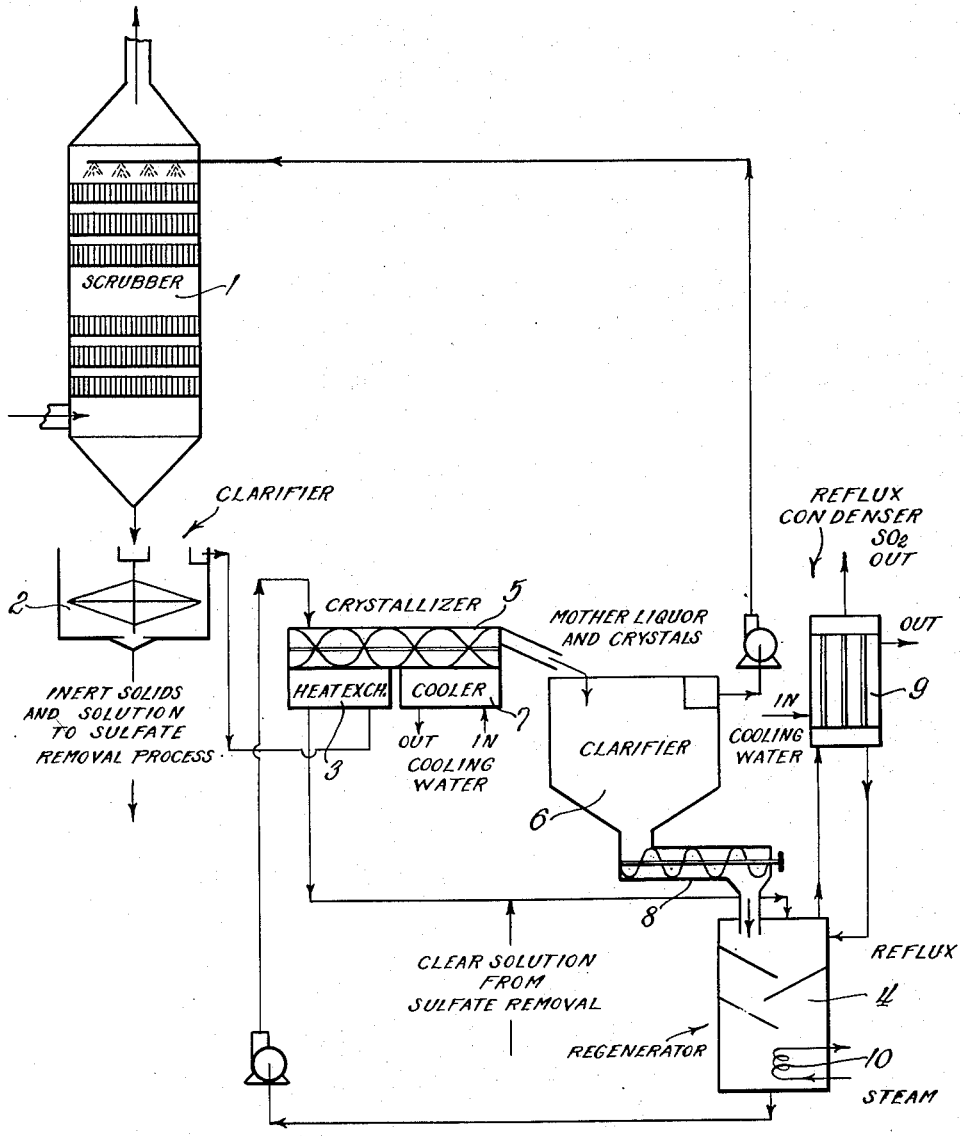

2,225,744

UNITED STATES PATENT OFFICE 2,225,744

PROCESS OF REMOVING AND RECOVERING SULPHUR DIOXIDE

Henry F. Johnstone, Urbana, Ill., assignor, by mesne assignments, to Commonwealth Edison Company, Chicago, Ill., a corporation of Illinois Application August 25, 1938, Serial No. 226,703

6 Claims. (Cl. 23—178)

This invention relates to the removal and recovery of sulphur dioxide from dilute waste gases such as boiler furnace gases, smelter gases, and those from the chemical process industries. This invention constitutes an improvement in the Process for removing and recovering sulphur dioxide from waste gases, disclosed in my United States Patent No. 2,082,006.

An object of my invention is to provide an efficient solvent for absorbing sulphur dioxide which will eliminate the resistance of the so-called liquid film known to exist when sulphur dioxide is absorbed by water.

Another object is to provide a means for regenerating the solvent by removing the dissolved sulphur dioxide in admixture with water vapor, thereby rendering the solvent in a condition suitable for absorbing more sulphur dioxide and simultaneously producing concentrated sulphur dioxide suitable for commercial uses.

A secondary object of my invention is to provide a method for greatly increasing the acidity of a solution by increasing its temperature and of greatly decreasing the acidity on cooling thereof. Such a reversible change has many important uses in chemical processes.

Other objects of my invention will, in part, be obvious and, in part, appear hereinafter.

For a more complete understanding of the nature and scope of my invention, reference may be had to the following detailed description taken in connection with the accompanying drawing in which the single figure is a flow sheet illustrating one embodiment of my invention.

In the cyclic process of recovering sulphur dioxide from waste gases by absorbing the gas in an aqueous solution containing a soluble sulphite and bisulphite and releasing the said gas by heating the solution, an excessive quantity of steam must be used for regeneration when treating such dilute gases. This is due to the low temperature coefficient of the vapor pressure of sulphur dioxide in equilibrium with the solution. With alkali, or ammonium sulphite-bisulphite solutions the percentage increase in vapor pressure of the sulphur dioxide over any increase in temperature is roughly equal to the percentage increase of the vapor pressure of water over the same range. The maximum ratio of sulphur dioxide to water vapor in the vapors leaving the regenerator, therefore, is approximately equal to the ratio of sulphur dioxide to water vapor in the waste gases. Another disadvantage of the simple solutions is the limitation of the extent of regeneration caused by the low vapor pressure of sulphur dioxide. Furthermore, since some finite vapor pressure of sulphur dioxide must exist in equilibrium with the regenerated solution even after cooling, it is usually impossible to remove completely the sulphur dioxide from the waste gases.

Modifications of the simple sulphite-bisulphite solutions to overcome these difficulties have been used. For example, using the salt of an organic acid, the acid of which increases in ionization as the temperature is raised, provides for greater capacity of the solution and a smaller steam requirement for regeneration. Such solvents for sulphur dioxide are described in my above-mentioned United States Patent 2,082,006. An additional advantage is secured when the organic acid is substantially insoluble at low temperatures and increases in solubility with increases in temperature.

Another method by which the above-mentioned difficulties may be overcome, comprises regenerating the sulphite-bisulphite solutions by a chemical means such as by treatment with a metallic oxide to precipitate a sulphite which can be decomposed into the said oxide and sulphur dioxide by calcination at a relatively low temperature. Such a process is described in the co-pending application of Johnstone and Singh, Serial No. 132,692, filed March 24, 1937.

When an organic acid is used as the auxiliary acid, some volatilization of the acid with steam usually occurs. This necessitates additional steps in the process to secure pure sulphur dioxide. Precautionary measures must also be taken when the insoluble acid separates into a second liquid phase to avoid loss by volatilization into the waste gas in the scrubber. Furthermore, many of the acids that have the desired properties are too expensive for use on a large scale. Also, a specific acid is most applicable to only one concentration of sulphur dioxide in the waste gas.

In the present invention these difficulties are eliminated by providing for the use of a partially soluble solid inorganic acid as the auxiliary acid whose ionization increases with increase in temperature. Such an acid is boric acid, of which the chemical formula is $H_3BO_3$. Boric acid is relatively abundant, cheap, and easily supplied. Consequently, its use in large quantities is economical. It also has many properties which make it a desirable acid to use as an aid in the regeneration of sulphite-bisulphite solutions. It is relatively insoluble in water, or sulphite-bisulphite solutions at normal temperatures, i. e., 15° to 30° C. Its solubility increases four fold between 30° C. and 100° C. and may be increased even more by raising the temperature above the normal boiling point by heating under pressure. While slightly volatile from concentrated solutions above 60° C., its volatility is negligible from its solutions below 50° C. Boric acid itself is an extremely weak acid, but its great increase in solubility causes it to liberate sulphur dioxide from a hot sulphite-bisulphite solution which has substantially no vapor pressure of sulphur dioxide at 50° C.

It is obvious that the boric acid may be introduced as one of its salts, as for example the sodium salt $Na_2B_4O_7.10H_2O$, or borax, as it is commonly called, or as the metaborate, $NaBO_2.2H_2O$. In an acid solution of borax, boric acid will be formed therefrom.

Due to its small ionization, boric acid is extremely weak. Its displacement of sulphur dioxide from sulphite-bisulphite solutions, therefore, is not complete even when the molar concentration of the acid is greater than that of sulphur dioxide at the high temperatures. The acid, however, has the property of increasing in strength in the presence of polyhydroxy organic compounds, such as mannitol, sorbitol, dulcitol, glycerol, and the sugars, glucose, levulose, and invert sugar. By the addition of the correct amount of these compounds to the boric acid-sulphite-bisulphite solution, more complete displacement of the sulphur dioxide at the high temperatures may be accomplished without materially decreasing the solubility of sulphur dioxide in the solution at the low temperature. The ratio of the polyhydroxy organic compound to the boric acid is preferably adjusted to give an acid of a strength which corresponds to the maximum capacity of the solution for absorbing sulphur dioxide. Too large a ratio renders the boric acid too strong and reduces the capacity of the solution.

EXAMPLES

Examples of the action of boric acid and boric acid-mannitol mixtures on a sulphite-bisulphite solution are given by the following experiments:

Test No. 1

A solution containing 1.33 moles of sodium and 0.98 mole of sulphur dioxide per liter was boiled under a reflux condenser for ten minutes. No sulphur dioxide was released and the composition remained constant. The same solution was boiled for ten minutes with 40 g. boric acid per 100 cc. solution. This quantity of acid was completely soluble at the boiling point. Evolution of sulphur dioxide commenced when the temperature of the solution reached 90° C. After the boiling, the concentration of sulphur dioxide in the solution was 0.45 mole per liter. On cooling to 30° boric acid separated out as white crystals. The supernatant liquid was heated to 50° C. and was saturated at this temperature with a gas containing approximately 0.5% sulphur dioxide. No crystals of boric acid separated out during the absorption. The concentration of sulphur dioxide after absorption was 0.70 mole per liter. The solution was mixed with the boric acid crystals and reheated to boiling for 10 minutes. The sulphur dioxide concentration was reduced to 0.38 mole per liter.

The molar ratio of alkali metal or alkali metal hydroxide to boric acid or boron in the above test solution during regeneration is—

$$1.33 : \frac{40 \times 1,000}{61.8 \times 100}, \text{ which is, } 0.205:1$$

That is, during sulphur dioxide evolution the molar ratio of alkali metal to boron in the solution is 0.205 to 1.0, and, during absorption the ratio of alkali metal to boron is greater than 0.205:1.0 due to crystallization of boric acid on cooling.

Test No. 2

A similar test was made starting with the same sodium sulphite-bisulphite solution, using 20 g. of boric acid per 100 cc. of the solution. After boiling for 10 min. the sulphur dioxide concentration was 0.76 mole per liter. After saturation with the dilute gas at 50°, it was 0.98 mole per liter. After boiling the second time for 10 minutes the concentration was again reduced to 0.79 mole per liter.

Test No. 3

A similar test was made starting with the same sodium sulphite-bisulphite solution, using 20 g. of boric acid and 30 g. of mannitol per 100 cc. of the solution. After boiling for 10 minutes, the sulphur dioxide concentration of the solution was 0.36 mole per liter. After saturation at 50° with dilute gas, it was 0.63 mole per liter. After boiling the second time, the concentration was reduced to 0.29 mole per liter.

These tests show (1) that the addition of boric acid to a sulphite-bisulphite solution increases the capacity of the solution as a solvent for absorbing sulphur dioxide in a cyclic process comprising absorption at a low temperature and regeneration at a higher temperature, (2) that the ratio of sulphur dioxide to water vapor is increased by the presence of the boric acid when the vapors leave the regenerator in equilibrium with the influent hot solution, (3) that precipitation of the boric acid in the scrubber can be prevented by cooling the solution to a temperature below that of absorption, (4) that the capacity of the solution for absorbing sulphur dioxide from a given gas increases with increase in concentration of boric acid in the hot solution, and (5) that the action of a low concentration of boric acid may be supplemented by mannitol to increase the capacity of the solution for the cyclic process.

Application of the invention to the cyclic process of removing and recovering sulphur dioxide is illustrated by the flow sheet shown in the drawing. The gases enter the scrubber 1 and come in contact with the absorbing solution preferably consisting of an alkali sulphite, sulphite-bisulphite, or sulphite-hydroxide solution. While the scrubbing device shown contains packing to increase the surface of contact between the gas and liquid, any other type of scrubber can be used such as a spray or a wet cyclone device. Either counter-current or co-current flow may be used in this process, and it is possible and often desirable to maintain a solution throughout the scrubber which has substantially no equilibrium vapor pressure of sulphur dioxide.

When absorbing sulphur dioxide from dust-laden gases, it is desirable to separate the suspended dust particles collected from the gas by clarification or by filtration before regeneration of the solution. The solution leaving the scrubber then enters the clarifier 2. The clear overflow passes through the heat exchanger 3 to the regenerator 4. The thickened underflow from the clarifier 2 may be discarded. Preferably it is sent as a side stream to a sulphate removal process since some oxidation of the sulphite to sulphate usually occurs in the cyclic operation. Furthermore, any sulphuric acid vapor in the waste gases will be absorbed by the solution, and to avoid decreasing the capacity of the solution the soluble sulphate must be removed continuously in an equivalent amount. This may be accomplished by the process described in my above-mentioned United States Patent No. 2,082,006, or by a modification thereof. Presence of the inert dust in the portion of the solution to be desulphated will not be a disadvantage in this process of desulphating.

Leaving the regenerator 4, the hot solution containing boric acid, or other suitable acid having the characteristics as set forth above, passes to the crystallizer 5 where it is cooled by heat interchange with the colder rich solution. It is further cooled by heat exchange with cold water in the cooler 7. The crystals and mother liquor then pass to the clarifier 6 where they are separated. The crystals in the form of a thick slurry are conveyed by means of the screw device 8 back to the regenerator 4. The clear regenerated solution is sent back to the scrubber 1, from the clarifier 6.

The regenerator may be heated by a steam coil 10 or by direct steam. The vapors leaving the regenerator consist essentially of sulphur dioxide and water vapor. In case the auxiliary acid is volatile with steam, it is desirable to condense the acid, and a portion or all of the water vapor, and return the condensate to the regenerator. This can be accomplished in a condenser 9.

It is understood that boric acid and its compounds with polyhydroxy organic substances serve as examples of other acids that may be used. Because of its many favorable properties, this auxiliary acid is a desirable one. Others, however, may be used and the invention should be understood to consist of the use of any auxiliary acid which can be substantially completely separated as a solid from the absorbing solution by cooling. A theoretical calculation shows that the auxiliary acids which increase the capacity of a sulphite-bisulphite solution for absorbing sulphur dioxide from dilute gases are characterized by having the product of the ionization constant and the solubility in moles per liter at 25° lie between $10^{-3}$ and $10^{-10}$. It is noted that use of a sulphite-bisulphite solution saturated with such acids gives greater capacity for the cyclic process than use of the unmodified solution whether or not the acid increases in solubility with rise in temperature. If the latter is an additional property of the acid, the capacity will be further increased, and the steam requirements for regeneration will be diminished.

Other acids which have properties similar to those mentioned above, i. e., highly insoluble at absorption temperatures and increasingly soluble at regeneration temperatures, increased ionization at regeneration temperatures, and precipitating as a solid from the cooled regenerated solution, are benzoic and succinic, both organic. It is understood also that application of the principles outlined above to the removal and recovery of other acid gases can be made. Thus, the properties of boric acid make it a useful auxiliary agent in releasing carbon dioxide from hot carbonate-bicarbonate solutions. Since the acid is reprecipitated at low temperatures, its presence increases the capacity of these solutions for absorbing carbon dioxide in a cyclic process.

I intend that my invention be limited in scope only as set forth in the appended claims.

I claim as my invention:

1. The cyclic process of removing and recovering sulphur dioxide from waste gases which comprises contacting said gases with a cooled aqueous solution of a sulphite and a polyhydroxy organic compound capable of increasing the strength of boric acid when in solution therewith, heating the enriched solution to regeneration temperature with boric acid sufficient to substantially saturate said solution, thereby releasing the absorbed sulphur dioxide, cooling the solution to precipitate boric acid, separating the precipitated boric acid, returning the solution to contact further with the gases and returning the precipitated boric acid to contact with the enriched solution in a cyclic manner, sufficient boric acid being precipitated by said cooling step to prevent further precipitation thereof during further contact of the solution with the gases.

2. The cyclic process of removing and recovering sulphur dioxide from waste gases which comprises contacting said gases with a cooled aqueous solution of a sulphite and mannitol, heating the enriched solution with boric acid to increase the concentration thereof over its concentration in said cooled solution, thereby releasing the absorbed sulphur dioxide, cooling the solution, separating the precipitated boric acid, returning the solution to contact further with the gases and returning the precipitated boric acid to contact with the enriched solution in a cyclic manner.

3. The cyclic process of removing and recovering sulphur dioxide from waste gases which comprises contacting said gases with a cooled aqueous solution of a sulphite and sorbitol heating the enriched solution with boric acid to increase the concentration thereof over its concentration in said cooled solution, thereby releasing the absorbed sulphur dioxide, cooling the solution, separating the precipitated boric acid, returning the solution to contact further with the gases and returning the precipitated boric acid to contact with the enriched solution in a cyclic manner.

4. The cyclic process of removing and recovering sulphur dioxide from waste gases which comprises contacting said gases with a cooled aqueous solution of a sulphite and glucose, heating the enriched solution with boric acid to increase the concentration thereof over its concentration in said cooled solution, thereby releasing the absorbed sulphur dioxide, cooling the solution, separating the precipitated boric acid, returning the solution to contact further with the gases and returning the precipitated boric acid to contact with the enriched solution in a cyclic manner.

5. In the cyclic process of removing and recovering sulphur dioxide from gases containing the same which comprises absorbing the sulphur dioxide in a cooled absorbing solution and thereafter heating said absorbing solution to regeneration temperature to evolve the absorbed sulphur dioxide, lowering the sulphur dioxide capacity of the heated absorbing solution by introducing into said solution boric acid sufficient to substantially saturate said solution and a polyhydroxy organic compound which increases the acidity of the boric acid at evolution temperatures with very little increase in acidity at absorption temperatures.

6. In the cyclic process of removing and recovering sulphur dioxide from gases containing the same which comprises absorbing the sulphur dioxide in a cooled absorbing solution and thereafter heating said absorbing solution to evolve the absorbed sulphur dioxide, lowering the sulphur dioxide capacity of the heated absorbing solution by introducing into said solution boric acid and a polyhydroxy organic compound capable of increasing the strength of boric acid when in solution therewith selected from the group consisting of mannitol, sorbitol, dulcitol, glycerol, glucose, levulose and invert sugar.

HENRY F. JOHNSTONE.